(12) United States Patent
Aruga et al.

(10) Patent No.: US 6,574,058 B1
(45) Date of Patent: Jun. 3, 2003

(54) RECORDING MEDIUM DETECTING APPARATUS FOR DISTINGUISHING BETWEEN A RECORDING MEDIUM HAVING A RELATIVELY HIGH COERCIVITY OR A RELATIVELY LOW COERCIVITY

(75) Inventors: Fusayoshi Aruga, Nagano (JP); Kenji Hirasawa, Nagano (JP); Junichi Nakajo, Nagano (JP); Kazutoshi Ishikawa, Nagano (JP)

(73) Assignee: Sankyo Seiki Mfg. Co., Ltd., Nagano (JP)

(*) Notice: Subject to any disclaimer, the term of this patent is extended or adjusted under 35 U.S.C. 154(b) by 0 days.

(21) Appl. No.: 09/444,850

(22) Filed: Nov. 22, 1999

(30) Foreign Application Priority Data

| Nov. 24, 1998 | (JP) | 10-332486 |
| Mar. 3, 1999 | (JP) | 11-057714 |
| Mar. 12, 1999 | (JP) | 11-067472 |
| Sep. 30, 1999 | (JP) | 11-280356 |

(51) Int. Cl.⁷ .................................. G11B 25/04
(52) U.S. Cl. ................................. 360/2; 360/69
(58) Field of Search ........................ 360/2, 25, 69; 235/449, 493

(56) References Cited

U.S. PATENT DOCUMENTS

| 4,847,558 A | * | 7/1989 | Fisher et al. | 360/25 X |
| 4,980,782 A | * | 12/1990 | Ginkel | 360/60 |
| 5,835,313 A | | 11/1998 | Sato et al. | |
| 6,141,161 A | * | 10/2000 | Sato et al. | 360/2 |
| 6,189,791 B1 | * | 2/2001 | Takita et al. | 235/449 |

FOREIGN PATENT DOCUMENTS

| EP | 0 092 763 A2 | | 11/1983 |
| EP | 1 024 452 A2 | | 8/2000 |
| JP | 1-180080 | * | 7/1989 |
| JP | 50 94 667 | | 4/1993 |
| JP | 10 255 211 | | 9/1998 |
| JP | 11-238203 | * | 8/1999 |
| JP | 11-283201 | * | 10/1999 |

* cited by examiner

*Primary Examiner*—David Hudspeth
*Assistant Examiner*—James L Habermehl
(74) *Attorney, Agent, or Firm*—Reed Smith LLP

(57) ABSTRACT

A technique for detecting a magnetic recording medium such as a strip on a magnetic card so as to distinguish between a case where a magnetic strip has high coercivity and one where it has low coercivity. A magnetic head detects the existence and appropriate positioning of a magnetic strip which is then fed to a permeability sensor that provides an output signal that is a function of the permeability magnetic strip. A circuit responsive to the output of the permeability sensor provides an output signal indicating the high coercivity strip when the permeability sensor output is low and indicating a low coercivity strip when the permeability sensor output is high.

20 Claims, 11 Drawing Sheets

RECORDING MEDIUM DETECTING APPARATUS FOR DISTINGUISHING BETWEEN A RECORDING MEDIUM HAVING A RELATIVELY HIGH COERCIVITY OR A RELATIVELY LOW COERCIVITY

BACKGROUND OF THE INVENTION

The present invention relates to a recording medium detecting apparatus and a recording medium detecting method. More specifically, the present invention relates to techniques which differentiate two different recording media distinguished by two different coercive forces.

Recording media, such as magnetic cards, having magnetic recording portions with different coercive forces, e.g. a magnetic strip, have been standardized. For example, in addition to conventional low coercive force cards standardized by JIS and ISO, ISO has newly standardized high coercive force cards of 2500 to 4200 Oe: (Oersted). Those high coercive force cards are advantageous in terms of protecting magnetic data recorded on magnetic cards. As a result, the tendency is to switch the low coercive force cards to the high coercive force cards; hence, both kinds of cards may be used together.

Generally, in the case of using magnetic cards with different coercive forces, appropriate write current corresponding to each coercive force must be used for writing in order to obtain an appropriate output. Therefore, a magnetic card reader and the like must comprise a function to determine whether a magnetic card inserted through a card insertion slot is a low coercive force card or a high coercive force card. Hence, a method to determine the coercive force of a magnetic strip on a magnetic card using a permeability sensor is considered. This permeability sensor provides a signal indicating the difference in the permeability of the magnetic strip and the permeability of a space without the magnetic strip. Since there is known relation between the permeability and the coercive force, the output from the permeability sensor can provide a basis for determining whether the magnetic card is a low coercive force card or a high coercive force card.

Inventors of the present invention concluded that, in the case of determining whether a magnetic card is a low coercive force card or a high coercive force card based on the output from the permeability sensor, as described above, the difference between the permeability of the magnetic strip on a low coercive force card and the permeability of the space without a magnetic strip is relatively large (10% and more) wherein the difference between the permeability of the magnetic strip on a high coercive force card and the permeability of the space without a magnetic strip is a small (less than 1%); therefore, it would be difficult to detect low coercive force cards and high coercive force cards merely based on the output from the permeability sensor.

Also, it is preferable that the permeability sensor contacts the magnetic strip of a magnetic card during its use. However, if the permeability sensor is simply placed in the path through which the magnetic card is transferred, the magnetic card tends to be pressed against the permeability sensor or dislocated therefrom during reading/writing of magnetic data. The speed of the magnetic card to be transferred is slightly altered at the moment when the permeability sensor contacts or is separated from the magnetic strip; this is a negative effect on reading/writing of the magnetic data. The above effect of the permeability sensor on the reading/writing process of the magnetic data should be considered.

The present invention intends to provide a recording medium detecting apparatus and a recording medium detecting method which can detect a low coercive force card and a high coercive force card by using a permeability sensor.

Further, the present invention intends to provide a recording medium detecting apparatus which appropriately performs reading/writing of magnetic data by using the permeability sensor and which allows flexibility in design.

BRIEF DESCRIPTION OF THE DISCLOSURE

Disclosed is an apparatus for detecting a recording medium such as a magnetic strip on a card. When the card is inserted into a card receiving slot, a magnetic head detects the magnetic strip. When the magnetic strip is present and properly placed, a shutter is opened so that the card can proceed further. A permeability sensor is employed in addition to the magnetic head to provide an output signal that is a function of the permeability of the magnetic strip. When the magnetic strip has a high coercivity and thus a relatively low permeability somewhat similar to the permeability of air, the output signal from the sensor is low. When the permeability of the magnetic strip is relatively high (representing low coercivity) the result is a magnetic field unbalanced which provides a substantial output signal.

By determining whether or not the output signal is significantly above or significantly below a particular threshold, a determination can be made that the magnetic strip is either high coercivity or low coercivity and the subsequent read or write operations can be appropriate to that coercivity.

This detection technique is particularly valuable in a context where there are substantially only two types of cards. With respect to the permeability or coercivity of the magnetic strip; one type being a relatively high coercivity, low permeability magnetic strip card and the other being a relatively low coercivity, high permeability magnetic strip card.

BRIEF DESCRIPTION OF THE FIGURES

FIGS. 4A and 4B show a configuration of lead wires for a magnetizing coil and a detecting coil of the FIG. 1 permeability sensor in which FIG. 4A is a view from the direction parallel to (along) an imaginary center line between the magnetic poles and FIG. 4B is a view from the direction perpendicular to the imaginary center line.

DESCRIPTION OF THE PREFERRED EMBODIMENTS

The following describes the configuration of the present invention based on embodiments shown in figures.

Figure 1:
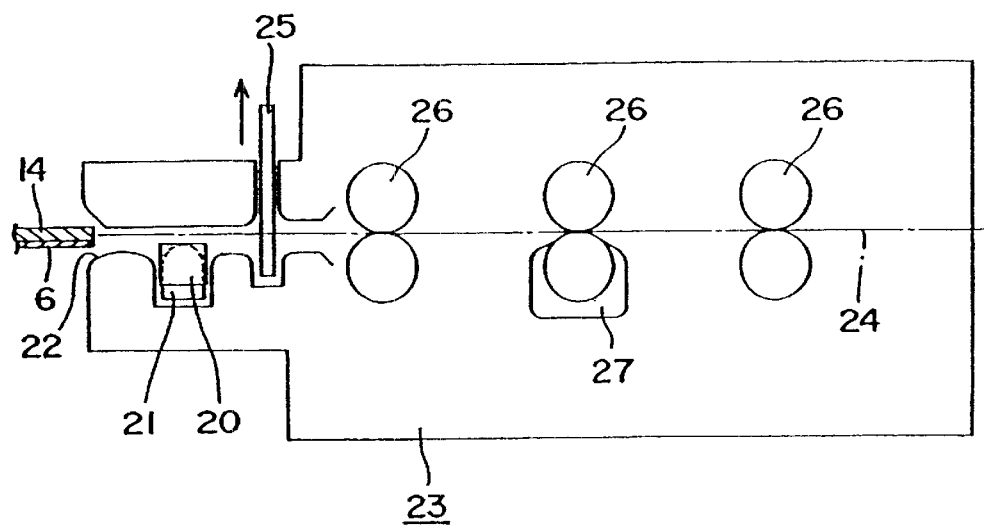
FIG. 1 is a schematic configuration showing an embodiment of a recording medium detecting apparatus according to the present invention when it is applied to a magnetic card reader.

FIG. 1 shows an embodiment of a recording medium detecting apparatus according to the present invention. This recording medium detecting apparatus is suitable for a magnetic card reader using, for example, magnetic card 14 as a recording medium. It determines the coercive force of magnetic card 14 (recording medium) having magnetic strip 6 as a magnetic recording portion, which is one of two kinds of magnetic recording portions with different coercive force.

The recording medium detecting apparatus comprises permeability sensor 20 which detects the permeability of magnetic strip 6 and magnetic head 21 which detects the existence of magnetic strip 6 by detecting recording signals thereof. When the permeability of magnetic strip 6 to be detected is first permeability, which is further different from the permeability of air than a first permeability (closer to the permeability of air), the coercive force of magnetic strip 6 is determined based on the output from permeability sensor 20 and magnetic head 21. Also, when magnetic strip 6 is of the second permeability, the coercive force thereof is determined based on the output from permeability sensor 20.

In other words, when magnetic cards 14 used with the recording medium detecting apparatus include both a high coercive force card, having a magnetic strip 6 with permeability (first permeability) close to the permeability of air, and a low coercive force card, having a magnetic strip 6 with permeability largely different from the permeability of air compared to the first permeability, the low coercive force card is determined based on the output permeability sensor 20 while the high coercive force card is determined based on the output of permeability sensor 20 and magnetic head 21.

Figure 2:
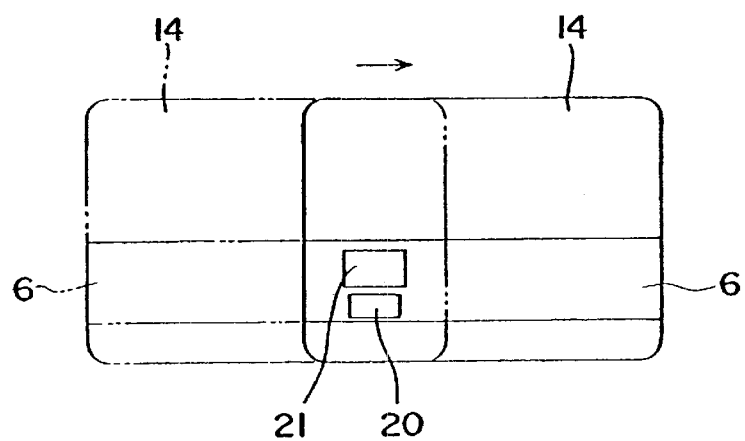
FIG. 2 shows the positional relationship between the permeability sensor, a magnetic head and magnetic strip of a magnetic card in the FIG. 1 embodiment.

In a magnetic card reader using the above recording medium detecting apparatus, magnetic card 14 is taken to inside 23 of the card reader through medium insertion slot 22. Also, shutter plate 25 is placed between medium insertion slot 22 and inside 23 and can be opened or closed in relation to medium transferring path 24 to accept magnetic card 14 into inside 23. Shutter plate 25 is opened or closed in relation to medium transferring path 24 by a shutter driving mechanism, not shown in the figure. In this embodiment, permeability sensor 20 and magnetic head 21 are placed at a position closer to medium insertion slot 22 than shutter plate 25. As shown in FIG. 2, permeability sensor 20 and magnetic head 21 are placed parallel to the direction of insertion of magnetic card 14. Also, they are formed to contact magnetic strip 6 of magnetic card 14 simultaneously.

Figure 3:
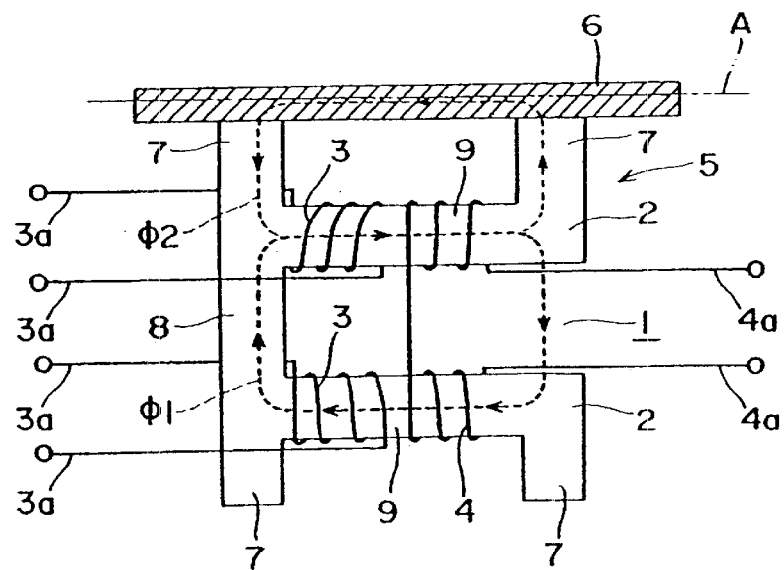
FIG. 3 is a schematic configuration showing the permeability sensor of the FIG. 1 embodiment.

FIG. 3 shows a detailed example of permeability sensor 20. Permeability sensor 20 comprises magnetic sensor portion 5, in which magnetizing coil 3 and detecting coil 4 are wound around two main magnetic poles 2; at least one of magnetic poles 2 has gap portion 1 and the magnetic poles 2 are positioned parallel to each other. Also, magnetic sensor portion 5 is such that a magnetic flux in one of main magnetic poles 2 is changed by magnetic strip 6 of magnetic card 1 which is transferred on medium transferring path 24. Accordingly, the change in the magnetic flux in one of the main magnetic poles 2 can be detected by detecting coil 4. In this embodiment, gap portion 1 is formed one end of each main magnetic pole 2 while the other ends are connected to each other by connecting portion 8.

Support core portion 7 is formed at one end of at least one of main magnetic poles 2 and is a support in forming a magnetic path while magnetic strip 6 of magnetic card 14 passes thereby. In this embodiment, support core portions 7 are formed on both ends of two of main magnetic poles 2. Each support core portion 7 projects away from connecting portion 8. Also, main magnetic poles 2 and support core portions 7 are formed integrally of a highly permeable magnetic material. The portion between support core portions 7 is coil winding portion 9 around which magnetizing coil 3 and detecting coil 4 are wound.

Magnetizing coils 3 are wound around coil winding portion 9 of both main magnetic poles 2. Each of magnetizing coils 3 is wound there around in the direction opposite from each other for the same number of turns. As a result, the magnetic fluxes in each of main magnetic poles 2 are directed opposite from each other such that magnetic flux $\phi 1$ of a closed loop in one direction is generated as a whole.

Figure 4:
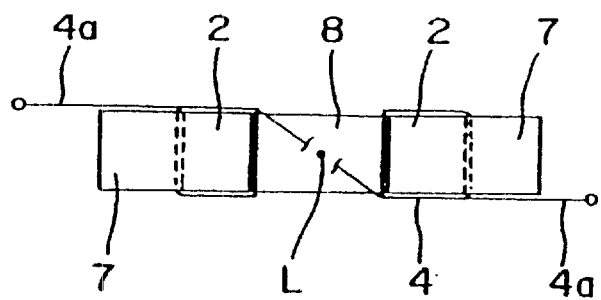
Figure 4B:
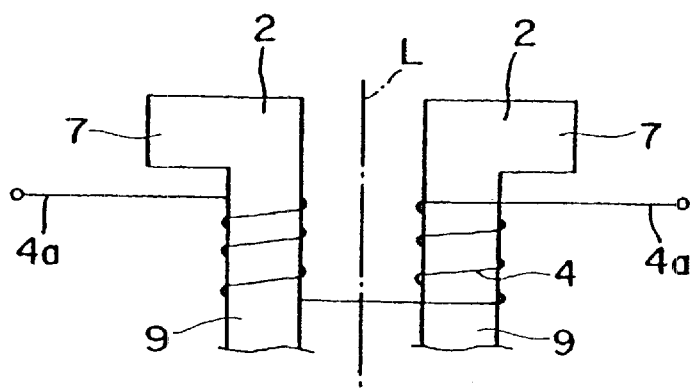

Lead wires $3a$, $4a$ of coils 3, 4 are positioned evenly in relation to main magnetic poles 2 to maintain the balance of the magnetic fluxes thereof. In other words, lead wires $3a$, $4a$ of coils 3, 4 are positioned for mirror symmetry on both sides of an imaginary center line and are equally distant from main magnetic poles 2; or, they are positioned for point-to-point symmetry around an imaginary center axis L, as shown in FIG. 4, when viewed from the direction shown in FIG. 4(A) (or from the top of FIG. 4(B)), suppose that each of main magnetic poles 2 is positioned at equal distance on both sides of imaginary center axis L. Due to the above positioning of lead wires $3a$, $4a$, the magnetic fluxes in main magnetic poles 2 are balanced while a magnetic card is not thereat. However, lead wires $3a$, $4a$ of coils 3, 4 do not have to be positioned as above; the magnetic fluxes of main magnetic poles 2 can be balanced by electrically correction in a circuit connected to coils 3, 4 while a magnetic card is not thereat. Also, it is supposed that magnetizing coil 3 supplies magnetizing current which is sufficient to detect the permeability of magnetic strip 6 within a range in which the highly permeable magnetic material of main magnetic poles 2 and support core portions 7 are not magnetically saturated.

As shown in FIG. 3, permeability sensor 20 is positioned such that main magnetic poles 2 are parallel to the surface A through which magnetic strip 6 of magnetic card 14 passes.

Figure 5:
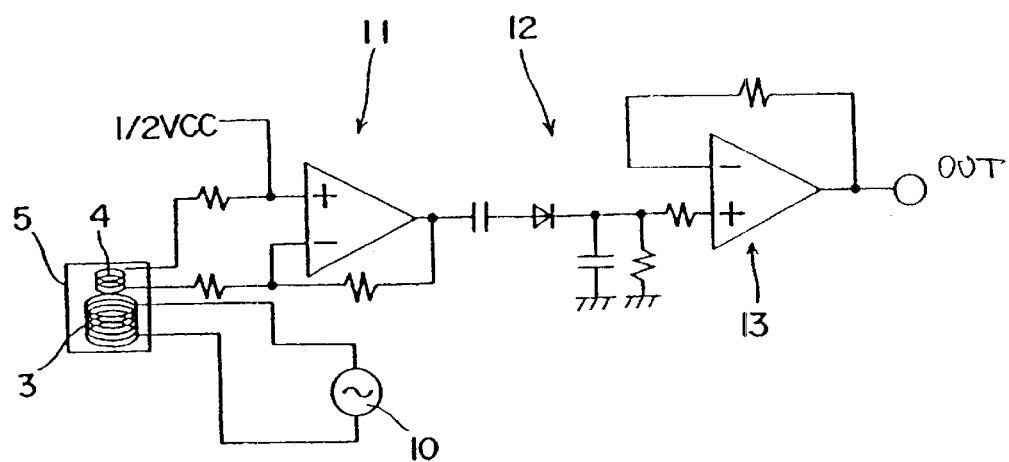
FIG. 5 shows a circuit connected to the magnetic sensor portion of the permeability sensor of FIG. 1.

A circuit shown in FIG. 5, for example, is connected to magnetic sensor portion 5 of permeability sensor 20. For example, magnetizing coil 3 is connected to alternating-current power supply 10 to generate the above magnetic flux $\phi 1$ of a closed loop through two main magnetic poles 2. When magnetic strip 6 does not exist at a detecting position of magnetic sensor portion 5 while the magnetic fluxes in main magnetic poles 2 are equal, the magnetic fluxes in main magnetic poles 2 are balanced such that the output of detecting coil 4 has a predetermined value. When magnetic strip 6 is positioned at magnetic sensor portion 5 under this circumstance, as shown in FIG. 3, magnetic flux $\phi 2$, which passes leaks from one of main magnetic poles 2 via support core portion 7 to magnetic strip 6, is generated; as a result, the balance between the magnetic fluxes in two of main magnetic poles 2 is lost. The leakage of magnetic flux $\phi 2$ changes according to the permeability of magnetic strip 6; therefore, the output of detecting coil 4 changes according to the permeability of magnetic strip 6. After the output of detecting coil 4 is amplified by amplifying circuit 11, it is half-wave-rectified by detecting phase circuit 12 and peak holding circuit 13 for envelope phase detection; thus, output signals corresponding to the permeability of magnetic strip 6 are obtained from an output terminal OUT. In this case, the order of amplification and detection can be switched. As described above, there is correlation between the permeability of magnetic strip 6 and the coercive force of magnetic strip 6; therefore, the coercive force of magnetic strip 6 can be identified based on the output from detecting coil 4 by confirming the output value of detecting coil 4 corresponding to the intensity of coercive force.

In other words, in this permeability sensor 20, magnetizing coil 3 is wound around a highly permeable core member in the shape of an approximate $\pi$ (see FIG. 3) such that magnetic flux $\phi 1$ becomes a closed loop while detecting coil 4 is wound around the core such that the flux becomes differential. Therefore, the magnetic flux is separated into the closed loop magnetic flux $\phi 1$ and magnetic flux $\phi 2$ depending on the permeability of magnetic strip 6 as magnetic strip 6 is positioned at magnetic sensor portion 5 wherein magnetic flux $\phi 2$ affects magnetic strip 6.

However, magnetic flux $\phi 2$ has an extremely small value and will not damage recorded data of magnetic strip 6.

In FIG. 1, magnetic head 21 detects the existence of magnetic strip 6 on magnetic card 14 based on its magnetic data. A pre-head is placed in the vicinity of medium insertion slot 22 of the magnetic card reader to determine whether the spatial arrangement of magnetic card 14 is correct (ex. the top/bottom surface of magnetic card 14 faces a correct direction) based on the existence of magnetic data thereon. In this embodiment, this pre-head is functioned as magnetic head 21. Magnetic head 21 can be a wire-wound magnetic head or a magneto-resistant element head.

A plurality of roller pairs 26, which transfers magnetic card 14, and magnetic head 27, which reads/writes magnetic data from magnetic strip 6 of magnetic card 14, are positioned at a given position in the inside 23 of the card reader. Each roller pair 26 is driven by a motor (not shown in the figure).

This recording medium comprises permeability sensor 20, which detects the permeability of magnetic strip 6, and magnetic head 21, which detects the existence of magnetic strip 6. When determining the coercive force of magnetic card 14 having magnetic strip 6 of two different coercive forces, the apparatus can detect the existence of magnetic strip 6 with magnetic head 21 while detecting the second permeability, further different from the permeability of air than the first permeability with permeability sensor 20. As a result, the permeability of the magnetic card is determined to be the first permeability, which is closer to the permeability of air, if it is not the second permeability; accordingly, the coercive force of the magnetic card is determined.

In other words, according to a recording medium detecting method of the present invention, when two kinds of magnetic cards, a high coercive force card having magnetic strip 6 with permeability close to the permeability of air (first permeability) and a low coercive force card having magnetic strip 6 with permeability largely different from the permeability of air compared to the first permeability (second permeability) are used therein, whether magnetic card 14 is a low coercive force card based on the output from permeability sensor 20 is determined while determining whether the magnetic card is a high coercive force card based on the output from permeability sensor 20 and magnetic head 21.

Figure 6:
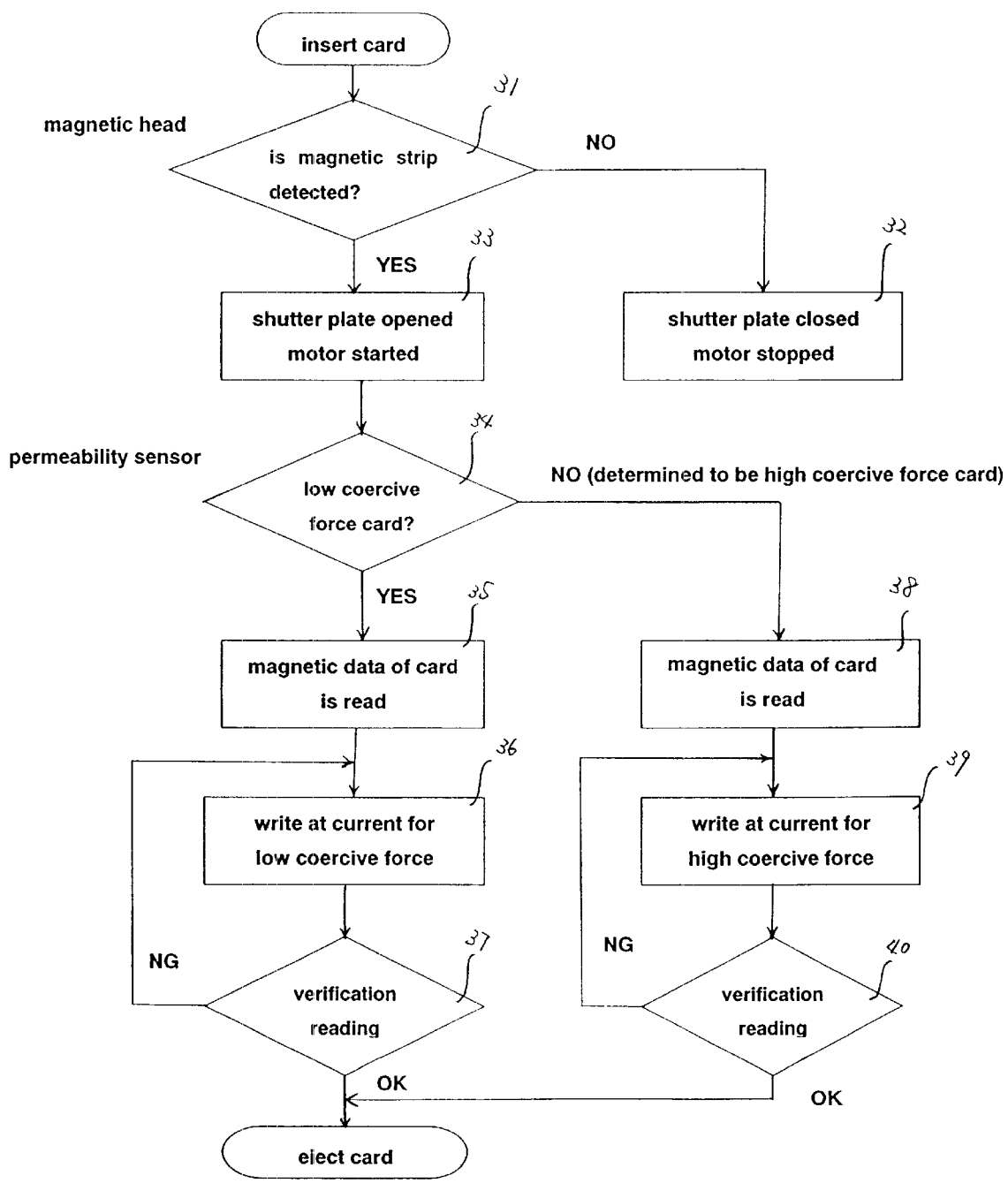
FIG. 6 is a flow chart showing an example of a recording medium detecting method according to the present invention.

The following describes a method for determining whether magnetic card 14 is a low coercive force card or a high coercive force card in relation to FIG. 6. First, when a user inserts magnetic card 14 into medium insertion slot 22, magnetic card 14 is transferred while its magnetic strip 6 is in contact with magnetic head 21 and permeability sensor 20 (FIG. 2). If magnetic card 14 is inserted upside down or the front and the rear is switched, or the inserted card is not appropriate for the apparatus, the magnetic data of magnetic strip 6 is not read out from magnetic head 21. Therefore, the process of determining the coercive force of the card cannot proceed from Step 31 to Step 32 to take in the inserted object. In other words, shutter plate 25 is still closed while the motor to drive roller pairs 26 is suspended.

When magnetic head 21 detects the existence of magnetic strip 6 as a magnetic recording portion, it is determined that the object inserted from medium insertion slot 22 is magnetic card 14 and that magnetic card 14 is inserted correctly. Then, the process proceeds to Step 33 to take in magnetic card 14 to the inside 23 of the apparatus. In other words, shutter plate 25 is opened while the motor is started to rotate roller pairs 26 such that magnetic card 14 is taken into the inside 23 of the apparatus.

In Step 34, the apparatus determines whether inserted magnetic card 14 is a low coercive force card or a high coercive force card based on the output from permeability sensor 20. If magnetic card 14 is a low coercive force card, the difference between the permeability of magnetic strip 6 and the permeability of air is large enough to be detected; the magnetic flux in main magnetic pole 2, which contacts magnetic strip 6, and the magnetic flux in main magnetic pole 2, which is in the space without magnetic strip 6, will be off-balance. On the other hand, when magnetic card 14 is a high coercive force card, the difference between the permeability of magnetic strip 6 and the permeability of air is insignificant; the magnetic fluxes generated between two main magnetic poles 2 will remain in balance. Hence, only extremely small value can be obtained as output from permeability sensor 20.

Accordingly, when the output from permeability sensor 20 is larger than a given threshold value, the inserted magnetic card 14 is determined to be a low coercive force card; then, the process proceeds from Step 34 to 35 to read the magnetic data recorded on magnetic strip 6 with magnetic head 27. After reading the magnetic data while transferring magnetic card 14 into the deep inside 23 of the apparatus, the motor reverses the rotational direction to transfer magnetic card 14 to the reverse direction, or towards shutter plate 25. Thereafter, the transferring direction is reversed again to write data onto the card with magnetic head 27 while transferring it to the deep inside 23 of the apparatus (Step 36). Since it is already determined that magnetic card 14 is a low coercive force card, magnetic head 27 writes magnetic data onto magnetic strip 6 at a current corresponding to a low coercive force card.

Then, the direction to transfer magnetic card 14 is switched once again to perform verification reading (verify read) while transferring magnetic card 14 towards shutter plate 25 (Step 37). When it is confirmed that the magnetic data is correctly written thereon, magnetic card 14 is ejected from medium insertion slot 22; if the above is not confirmed, the process returns to Step 36 to repeat the writing of the magnetic data.

If the output from permeability sensor 20 is less than the given threshold in Step 34, as inserted magnetic card 14 is already determined to be a magnetic card, it is determined that the magnetic card is a high coercive force card. Then, the process proceeds to Step 38 to read magnetic data recorded on magnetic strip 6 with magnetic head 27. After reading the magnetic data while transferring magnetic card 14 to the deep inside 23 of the apparatus, the rotational direction of the motor is reversed to transfer magnetic card to the reverse direction, or towards shutter plate 25. Thereafter, the transferring direction is switched again, and magnetic head 27 writes magnetic data onto the magnetic card while transferring it to the deep inside 23 of the apparatus. Since it is already determined that magnetic card 14 is a high coercive force card, magnetic head 27 writes magnetic data onto magnetic strip 6 at a current corresponding to a high coercive force card.

Then, the direction to transfer magnetic card 14 is switched once again to perform verification reading while transferring magnetic card 14 towards shutter plate 25 (Step 40). When it is confirmed that the magnetic data is correctly written thereon, magnetic card 14 is ejected from medium insertion slot 22; if the above is not confirmed, the process returns to Step 39 to repeat the writing of the magnetic data.

After ejecting magnetic card 14, the motor to rotate roller pairs 26 is stopped, and shutter plate 25 is closed.

As described above, the apparatus can accurately determine whether magnetic card 14 used therein is a low coercive force card or a high coercive force card based on the output from magnetic head 21 and the output from permeability sensor 20. In other words, the output from permeability sensor 20 varies depending on the permeability of magnetic strip 6 on magnetic card 14. Since the difference between the permeability of magnetic strip 6 and the permeability of air is insignificant in a high coercive force card, it is difficult to detect a high coercive force card only by permeability sensor 20 which provides output based on the difference between the permeability of air and the permeability of magnetic strip 6. Nonetheless, the existence of magnetic strip 6 is already detected by magnetic head 21; therefore, the apparatus can determine that magnetic strip 6 is of a high coercive force card when the output from permeability sensor 20 is less than the given threshold in spite of the existence of magnetic strip 6 previously confirmed by magnetic head 21.

Also, by placing permeability sensor 20 and magnetic head 21 in parallel, magnetic head 21 can detect whether permeability sensor 20 is in contact with magnetic strip 6. In other words, permeability sensor 20 detects magnetic strip 6 based on a difference in magnetic fluxes generated between main magnetic pole 2, which generates a magnetic flux passing through magnetic strip 6, and another main magnetic pole 2 which is positioned in the space without magnetic strip 6. Accordingly, when magnetic strip 6 and main magnetic pole 2, which is supposed to contact thereto, is apart from each other, the space between main magnetic pole 2 and magnetic strip 6 lowers the sensitivity to detect permeability as both main magnetic poles 2 are placed in air. As a result, even when magnetic strip is of a low coercive force card, the output from permeability sensor 20 becomes less than the given threshold; therefore, it is important that one can confirm whether the output is provided while one of main magnetic poles 2 and magnetic strip 6 are in contact or are separated from each other. Magnetic head 21 detects magnetic strip 6 by contacting it. Hence, permeability sensor 20 and magnetic head 21 are positioned parallel and adjacent to each other such that when magnetic head 21 detects magnetic strip 6 by contacting it, it can determine that permeability sensor 20 is also in contact with magnetic strip 6. Since permeability sensor 20 can be functioned as a contact sensor, on can prevent a low coercive force card from being mistakenly determined as a high coercive force card. Accordingly, one can prevent an accident such as destroying data recorded on a track adjacent to magnetic strip 6 by writing on a low coercive force at a large current which is supposed to be for a high coercive force card.

Figure 7A:
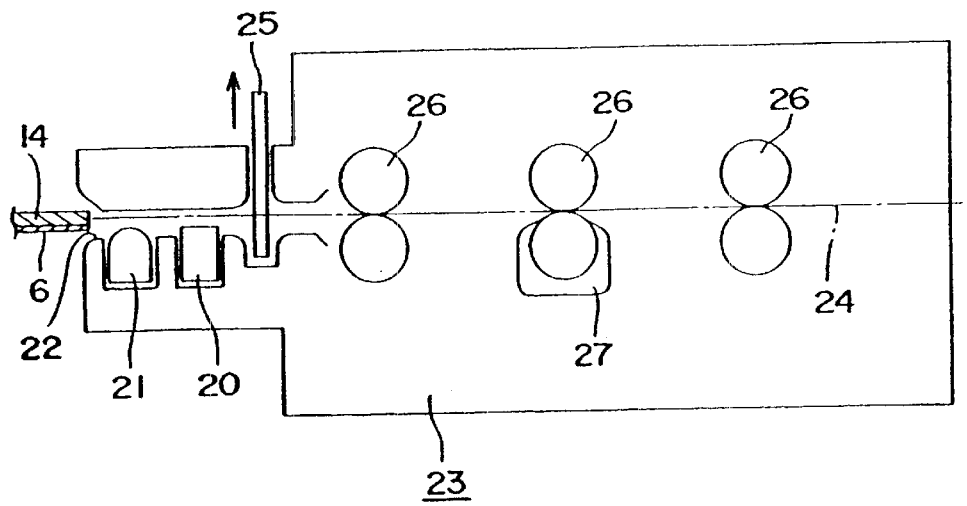
FIG. 7A is a schematic configuration showing another embodiment of a recording medium detecting apparatus according to the present invention.
Figure 7B:
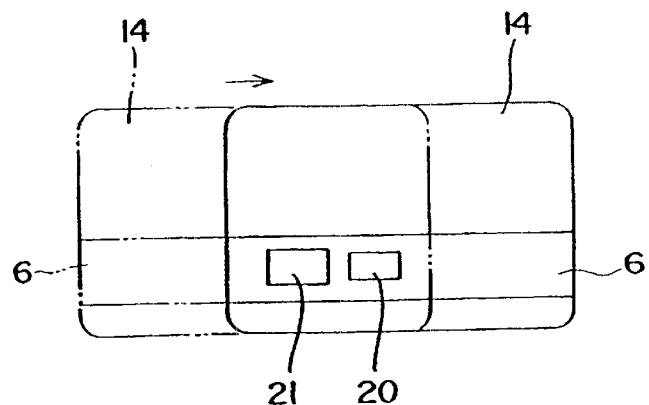
FIG. 7B shows the positional relationship between a permeability sensor, a magnetic head and a magnetic strip of a magnetic card in the FIG. 7A embodiment.

In the above description, permeability.sensor and magnetic head 21 are positioned parallel to each other; however, they can be linearly positioned adjacent to each other, as shown in FIGS. 7(A),(B). In this case, as shown in FIG. 7(B), magnetic head 21 can be functioned as a contact sensor, which detects whether permeability sensor 20 is in contact with magnetic strip 6, by placing permeability sensor 20 and magnetic head 21 adjacent to each other.

Figure 8:
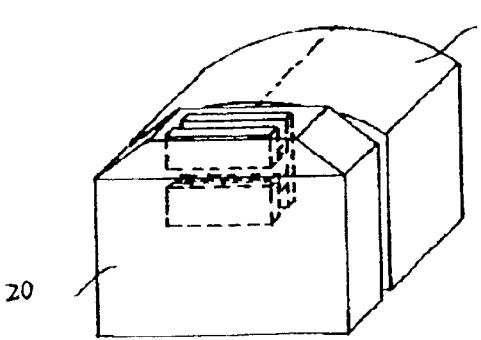
FIG. 8 is an oblique view of the another embodiment of a recording medium detecting apparatus according to the present invention.

Additionally, permeability sensor 20 and magnetic sensor 21 are formed separately in this embodiment. However, one can form a sensor body or a head body by integrating permeability sensor 20 and magnetic head 21. For example, FIG. 8 shows a configuration in which permeability sensor 20 and magnetic head 21, which are positioned parallel to each other in FIG. 2, are integrated as one piece.

Further, though not shown in figures, one can integrate permeability sensor 20 and magnetic head 21, in which the magnetic core portions thereof are shared; the integrated piece can be stored in a case to decrease the size of the apparatus.

Moreover, instead of magnetic head 21, a magneto-resistant element head, using a magneto-resistant element, can be attached or assembled to or into permeability sensor 20.

Also, permeability sensor 20 and magnetic head 21 are placed closer to medium insertion slot 22 than to shutter plate 25 in the above description. However, one can form magnetic head (pre-head) 21 closer to medium insertion slot 22 than to shutter plate 25 while permeability sensor 20 is formed inside 23 of the apparatus further than shutter plate 25. In this case, it is preferable to separately form a contact sensor which detects whether permeability sensor 20 is in contact with magnetic strip 6.

The following describes another embodiment of the present invention.

Figure 9:
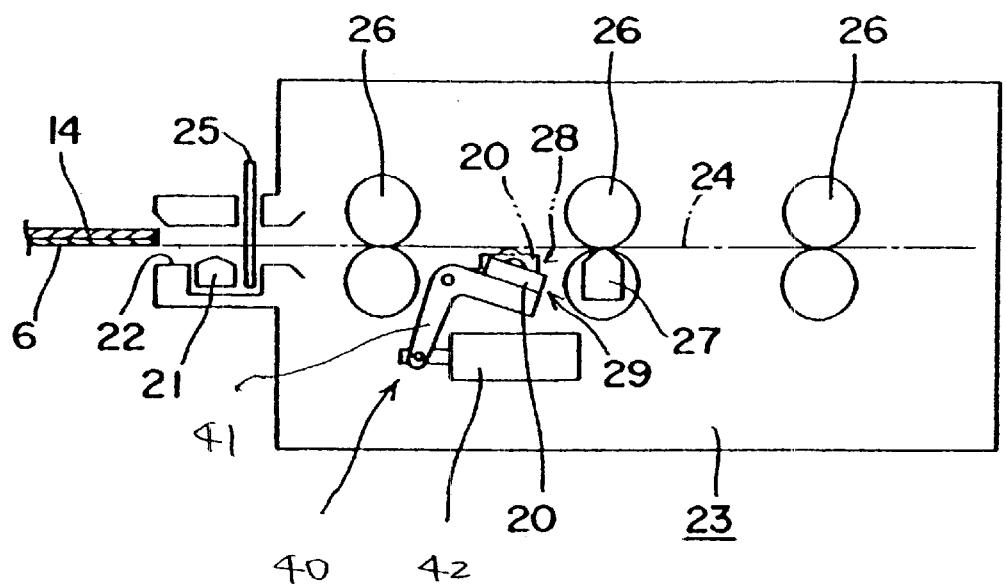
FIG. 9 is a schematic configuration showing another embodiment of a recording medium detecting apparatus according to the present invention.

FIG. 9 shows another example of a recording medium detecting apparatus according to the present invention. In this recording medium detecting apparatus, permeability sensor 20, which detects the permeability of magnetic strip 6, is mounted on sensor shifting mechanism 40 on side 23 of the card reader apparatus such that permeability sensor 20 can be shifted between contact position 28, at which it contacts magnetic card 14 as a recording medium, and distant position 29, at which it is distant from magnetic card 14. Permeability sensor 20 is shifted to contact position 28 only when the permeability of the card is determined.

Figure 10:
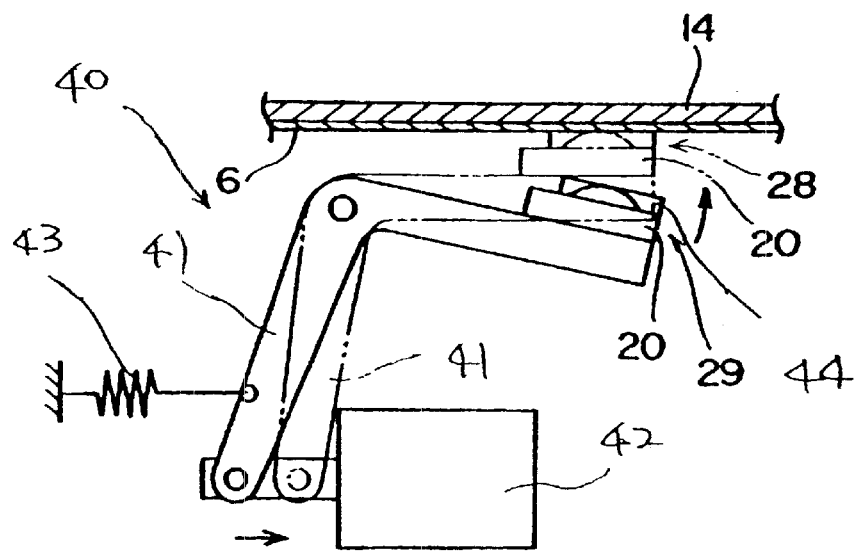
FIG. 10 is a schematic configuration of a sensor shifting mechanism according to the present invention.

Sensor shifting mechanism 40 comprises lever 41, which is, for example, shaped as an approximate L and which is supported at the center such that it swings, and solenoid 42 which swings lever 41. Permeability sensor 20 is fixed at the end of lever 41; when solenoid 42 is turned on, lever 41 swings toward medium transferring path 24 such that permeability sensor 20 shifts to contact position 28 (the position indicated with dotted lines in FIG. 10). When solenoid 42 is turned off, lever 41 swings in the direction away from medium transferring path 24 by return spring 43 such that permeability sensor 20 shifts to distant position 29 (the position indicated with solid lines in FIG. 10). The recording medium detecting apparatus comprises magnetic head 21 which detects the existence magnetic strip 6 as a magnetic recording portion of magnetic card 14 as a magnetic medium; permeability sensor 20 is shifted to contact position 28 when the output from magnetic head 21 is detected.

Also, sensor shifting mechanism 40 comprises contact sensor 44 which detects when permeability sensor 20 contacts magnetic card 14. Contact sensor 44 can be a magnetic head, for example, wherein permeability sensor 20 and contact sensor 44 are placed parallel and adjacent to each other in the direction of magnetic card 14 to be transferred. Also, permeability sensor 20 and contact sensor 44 detects magnetic strip 6 by contacting it. Hence, permeability sensor 20 and contact sensor 44 are positioned parallel to each other such that when contact sensor 44 detects magnetic strip 6 by contacting it, it can determine that permeability sensor 20 is also in contact with strip 6.

This magnetic card reader takes magnetic card 14 in from medium insertion slot 22 to inside 23 of the apparatus, similar to the previous embodiment. Also, shutter plate 25 is formed between medium insertion slot 22 and inside 23 of the apparatus and can be opened or closed in relation to medium transferring path 24 to allow magnetic card 14 into inside 23 of the apparatus.

Permeability sensor 20 shown in FIG. 9 is placed within a range in which magnetic card 14 is transferred for reading/writing of data by magnetic head 27. Accordingly, the size of the apparatus can be decreased by placing permeability sensor 20 in the vicinity of magnetic head 27. Also, permeability sensor 20 can be more freely positioned such that the design of the recording medium detecting apparatus can be more flexible.

The following describes operation of the recording medium detecting apparatus of this embodiment.

When magnetic card 14 is not inserted in the magnetic card reader, solenoid 42 is turned off; lever 41 is pulled by return spring 43 such that permeability sensor 20 is shifted to distant position 29.

When magnetic card 14 is inserted through medium insertion slot 22, magnetic head 21 detects magnetic card 14; then, solenoid 42 of sensor shifting mechanism 40 is turned on. Accordingly, lever 41 swings against the spring force of return spring 43 such that permeability sensor 20 is shifted to contact position 28. At the same time, shutter plate 25 opens, and a motor rotates roller pairs 6 to take magnetic card 14 in to inside 23 of the apparatus. Thus, magnetic strip 6 moves toward permeability sensor 20 such that the permeability of magnetic strip 6 can be detected. There is a correlation between the permeability of magnetic strip 6 and the coercive force of magnetic strip 6; therefore, as described previously, the coercive force of magnetic strip 6 can be identified based on the output from permeability sensor 20.

While detecting the permeability of magnetic strip 6 by permeability sensor 20, magnetic head 27 reads magnetic data recorded on magnetic strip 6. After completing the necessary reading of magnetic data, solenoid 42 is turned off such that lever 41 swings as if being pulled by return spring 43. Accordingly, permeability sensor 20 is shifted to distant position 29. Thereafter, roller pairs 26 are rotated in the reverse direction, and magnetic head 27 writes data onto magnetic card 14 while transferring the card towards medium insertion slot 22. Since the coercive force of magnetic strip 6 is already detected, magnetic head 27 writes data at current corresponding to the coercive force. Under this condition, permeability sensor 20 is shifted to distant position 29; therefore, permeability sensor 20 is prevented from contacting transferred magnetic card 14 to alter the transferring speed causing negative effects on the writing process of the magnetic data. Also, since permeability sensor 20 is separated from magnetic strip 6, abrasion of permeability sensor 20 can be prevented.

After the writing of the magnetic data, the rotational direction of roller pairs are reversed again to perform verification reading while transferring magnetic card 14 to deep inside 23 of the apparatus. Again, since permeability sensor 20 is shifted to distant position 29, the verification reading can be accurately performed without fluctuation in the transferring speed, and abrasion of permeability sensor 20 can be prevented. After confirming that the writing of the magnetic data is correctly performed by the verification reading, magnetic card 14 is ejected. Herein, permeability sensor 20 is shifted to distant position 29 such that abrasion of permeability sensor 20 is prevented.

As described above, by providing sensor shifting mechanism 40, permeability sensor 20 is shifted to contact position 28 when the coercive force of magnetic strip 6 of magnetic card 14 is to be detected. Therefore, permeability sensor 20 is prevented from contacting or being separated from magnetic strip 6 while magnetic head 27 is reading/writing the data. As a result, one can prevent fluctuation in the transferring speed of magnetic card 14, which would cause negative effects on the reading/writing process. Also, durability of permeability sensor 20 can be improved by avoiding abrasion of permeability sensor 20.

In the above description, lever 41 of sensor shifting mechanism 40 is swung by solenoid 42. However, solenoid 42 can be replaced by a motor and the like.

Also, permeability sensor 20 is placed within a range in which magnetic card 14 is transferred for reading/writing of data by magnetic head 27 in the above description. However, permeability 20 can be placed beyond this range.

Furthermore, magnetic head 21, which detects the existence of magnetic strip 6 of magnetic card 14, and magnetic head 27, which reads/writes magnetic data, are separated in the above embodiment. However, one can use magnetic head 27 for magnetic head 21, that is, one can form magnetic head 27 such that it can also detect the existence of magnetic strip 6.

Figure 11:
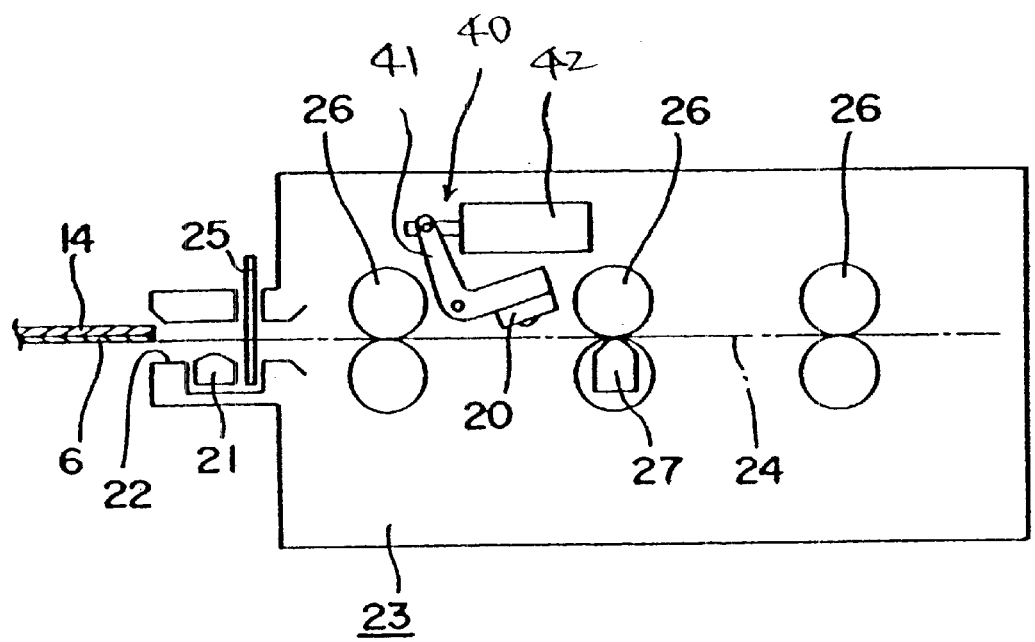
FIG. 11 is a schematic configuration of yet another embodiment of a recording medium detecting apparatus according to the present invention.

Additionally, according to the above description, permeability sensor 20 faces the surface of magnetic card 14 having magnetic strip 6. However, as shown in FIG. 11, it can be formed to face the surface opposite from the surface having magnetic strip 6. In other words, the permeability of magnetic strip 6 can be detected from the opposite surface of magnetic card 14.

Also, sensor shifting mechanism 40 does not have to comprise an actuator; for example, the actuator used for opening/closing shutter plate 25 can be used as an actuator for sensor shifting mechanism 40, or permeability sensor 20 can be shifted between contact position 28 and distant position 29 in conjunction with the movement of opening/closing of shutter plate 25.

Additionally, shutter plate 25 is not essential; it can be omitted.

The following describes a modified example of magnetic sensor portion 5 used as permeability sensor 20.

Figure 12:
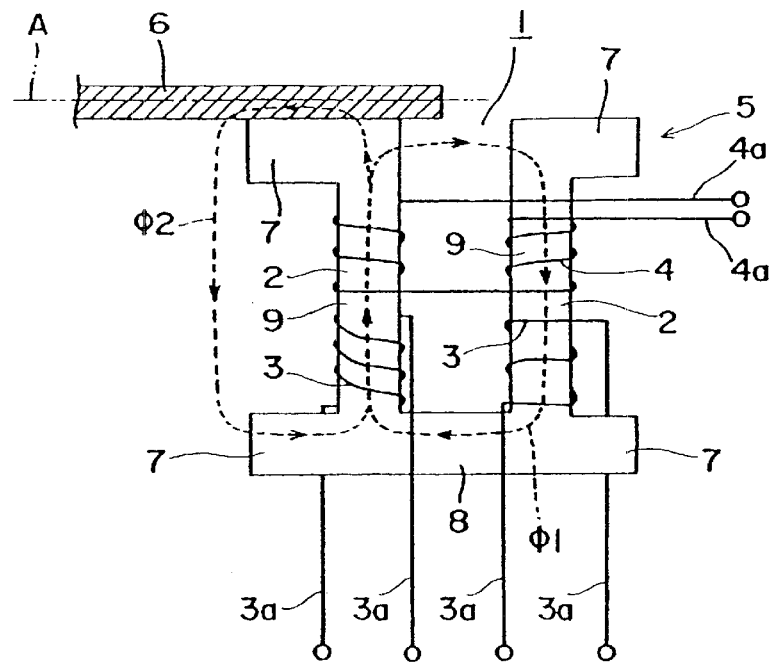
FIG. 12 is a schematic configuration showing a second embodiment of the permeability sensor.

The configuration of magnetic sensor portion 5 can be such that two main magnetic poles 2 are placed perpendicular to plane A through which magnetic strip 6 passes, as shown in an embodiment of FIG. 12. In this case, magnetic sensor portion 5 is positioned at a position where magnetic strip 6 affects only the magnetic flux of one of main magnetic poles 2. That is, magnetic sensor portion 5 is positioned such that one of main magnetic poles 2 faces magnetic strip 6 on a path through which magnetic strip 6 is transferred; the magnetic fluxes of main magnetic poles 2 become off-balance when magnetic strip 6 approaches one of main magnetic poles 2. Or, magnetic sensor portion 5 can be placed such that both main magnetic poles 2 face the path through on which magnetic strip 6 is transferred; in this case, the permeability of magnetic strip 6 should be detected when transferred magnetic strip 6 is affecting the magnetic flux of one of main magnetic poles 2, in other words, when two magnetic fluxes of main magnetic poles 2 are not in balance. Magnetic strip 6 faces both of main magnetic poles 2 after the permeability is detected; therefore, the most of the magnetic fluxes in main magnetic poles 2 flows through magnetic strip 6. As a result, it is preferable to detect the permeability by using magnetic fluxes at an intensity which would not damage recorded data, or magnetic sensor portion 5 is positioned to face an area of magnetic strip 6 without the magnetic data and the area between tracks, on which magnetic data are not recorded, of magnetic strip 6

Figure 13:
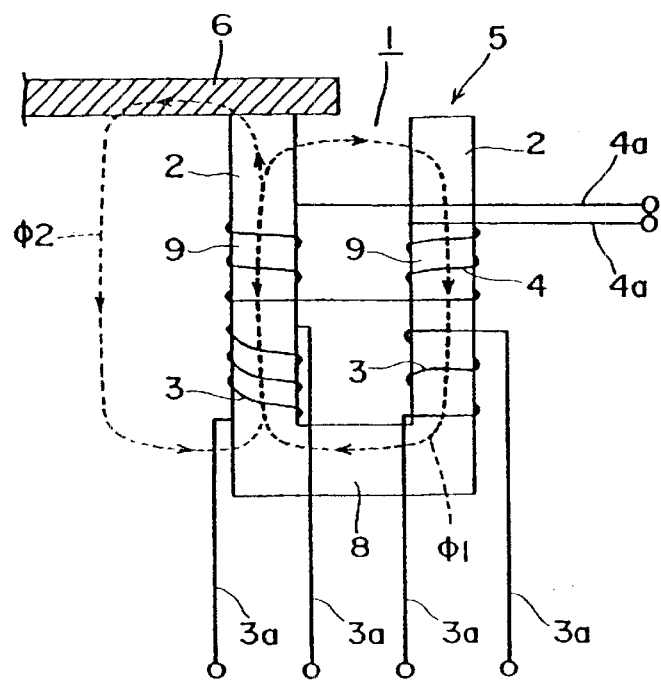
FIG. 13 is a schematic configuration showing a third embodiment of the permeability sensor.

Also, in the above described permeability sensor 20, support core portions 7 are formed on both ends of each of main magnetic poles 2. However, they are not essential to the present invention; one can form support core portions 7 only on one end of main magnetic poles 2, or omit all support core portions 7. For example, as shown in FIG. 13, support core portions 7 can be omitted.

Figure 14:
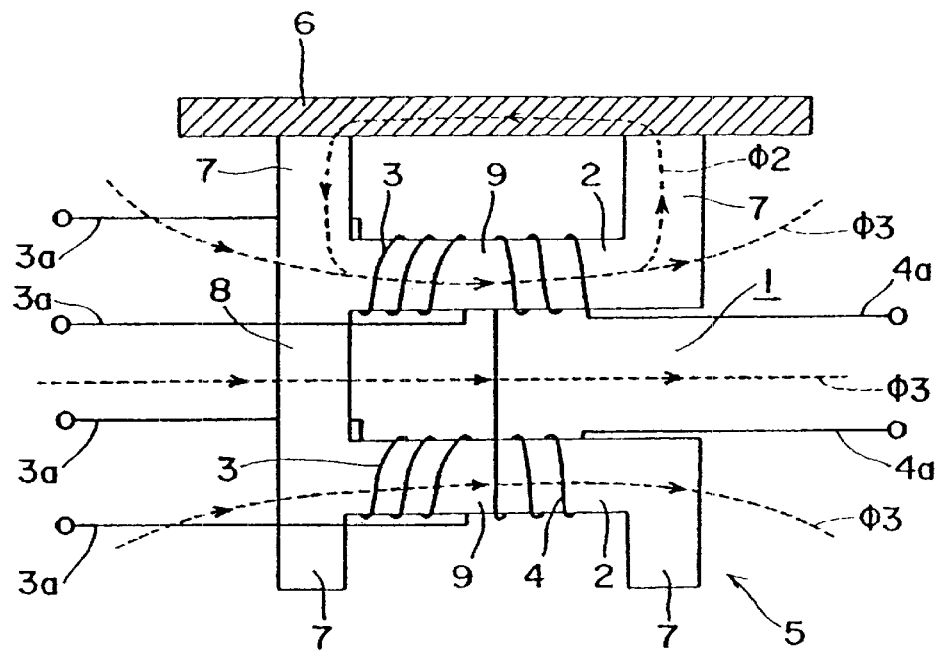
FIG. 14 is a schematic configuration showing a fourth embodiment of the permeability sensor.

Furthermore, according to permeability sensor 20, magnetizing coils of main magnetic poles 2 are wound in opposite directions such that the magnetic fluxes in main magnetic poles 2 are directed in opposite from each other to generate closed loop magnetic flux φ1. However, as shown in FIG. 14, one can wind magnetizing coils 3 of main magnetic poles 2 in the same direction such that the magnetic fluxes in main magnetic poles 2 flow in one direction as magnetic flux φ3. In this case, when magnetic strip 6 approaches one of main magnetic poles 2, magnetic flux φ2, in which most of the magnetic flux in one of main magnetic poles 2 flows through magnetic strip 6, is generated. Therefore, it is preferable to detect the permeability by using magnetic fluxes at an intensity which would not damage recorded data, or magnetic sensor portion 5 is positioned to face an area of magnetic card 14 without magnetic strip 6.

Also, magnetizing coils 3 are wound around each of main magnetic poles 2 in the above permeability sensor 20. However, one can use only one magnetizing coil 3 there around by forming magnetizing coil 3 at connecting portion 8.

Moreover, one detecting coil 4 is wound around main magnetic poles 2 in the above permeability sensor 20. However, one can use two detecting coils 4 around main magnetic poles 2 to provide differential output from each of detecting coils 4.

In addition, one detecting coil 4 can be wound around two main magnetic poles 2 as one main magnetic pole.

The following describes a detail example of a detecting circuit used in the present invention.

Permeability sensor 20 comprises two symmetrical main magnetic poles 2 as a main part, which are placed parallel to each other and which are connected by connecting portion 8. Two systems of magnetizing coils 3, 3 and detecting coil 4, which is linearly differential-connected, are wound around main magnetic poles 2 to form magnetic sensor portion 5. A magnetic flux in one of main magnetic poles 2 of magnetic sensor portion 5 is altered by a magnetic layer such as magnetic strip 6 of magnetic card 14 as a magnetic medium. A magnetizing current, at which the permeability of magnetic strip 6 can be detected without magnetically saturating the highly permeable core member of main magnetic poles 2 and support core portions 7, is provided to magnetizing coils 3. When the magnetic flux in one of main magnetic cores 2 is altered, the change can be detected by detecting coil 4.

Figure 15:
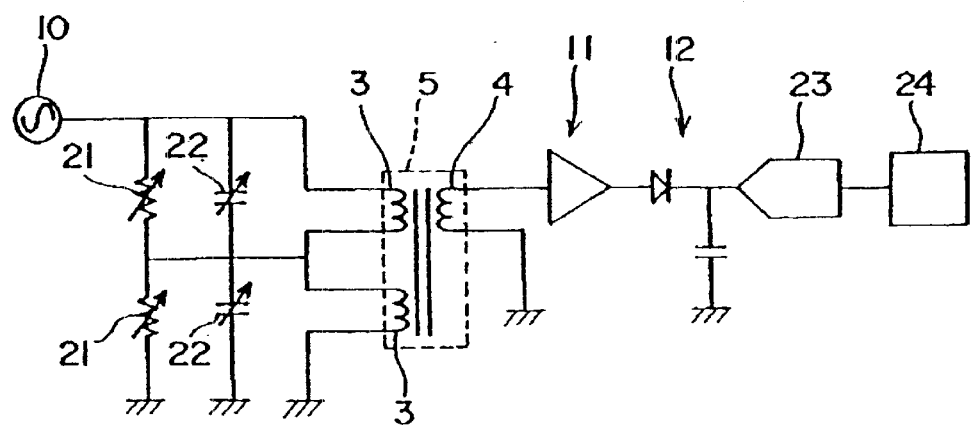
FIG. 15 shows a circuit which is a detecting circuit connected to the magnetic sensor portion and which includes an adjustment means.

FIG. 15 shows the above circuit with an additional circuit which adjusts the balance in the sensor, to adjust the sensor output characteristics. This circuit comprises an adjusting means on the side of a driving circuit to send magnetizing signals; more specifically, it comprises two of variable resistors 21 for level adjustment and two of variable condensers for phase adjustment. These adjust the balance in the magnetic flux of the circuit on the side of the magnetizing coil.

The detecting output from detecting coil 4, that is, sensor output P, can be provided when it is larger than the output without magnetic strip 6 or when it is smaller than the output without magnetic strip 6 as the magnetic flux in one side of magnetic gap portion 1, that is, the magnetic flux in one of main magnetic poles 2 is altered by magnetic strip 6. However, if it is configured such that sensor output P becomes larger than the output without magnetic strip 6, offset must be provided such that reference sensor output P0 without magnetic strip 6 becomes larger than the amount of change in balance of sensor output P caused by an outside cause; also, a range of change in sensor output P should be established to be larger than the range of change in the above balance such that the sensor output does not surpass the minimum level of the detecting output (remaining on the left side of minimum point M). If it is configured such that sensor output P becomes smaller than the output without magnetic strip 6, offset must be provided such that reference sensor output P1 to detect magnetic strip 6 becomes larger than the amount of change in balance caused by an outside cause; also, a range of change in sensor output P should be established to be larger than the range of change in the above balance such that the sensor output does not surpass the minimum level of the detecting output.

The following describes an example in which offset is provided to the sensor output characteristics normally adjusted to minimum point M by using variable condenser 22 which can adjust the balance.

Figure 18:
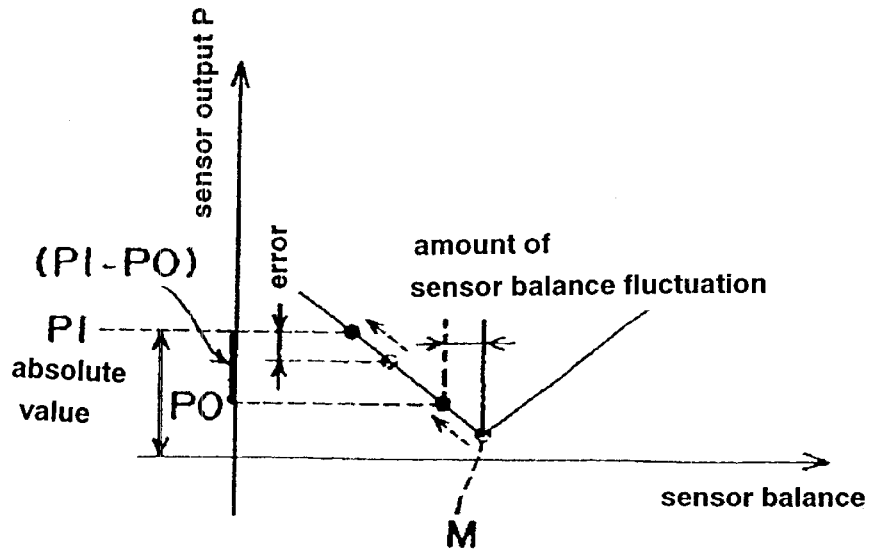
FIG. 18 is a graph of the sensor balance and the sensor output indicating sensor output characteristics in the magnetic medium detecting apparatus of the present invention.

In the embodiment shown in FIG. 18, the output characteristics, which are normally positioned at minimum point M, is displaced by providing offset in advance using variable condenser 22 which can adjust the balance thereof. In other words, reference sensor output P0, which is the output without magnetic strip 6, is shifted to the right or left of minimum point M, which is the minimum level of the detecting output as a result of the adjusted balance. Accordingly, reference sensor output P0 changes in one direction to which minimum point M is shifted as above; as a result, sensor output P is detected. For example, in FIG. 18, the output characteristics are shifted to the left, where the sensor balance is decreased, and is increased with magnetic strip 6 compared to without it. Then, sensor output P is detected only in the area left of minimum point M. Therefore, reference sensor output P0, when the magnetic force is balanced without magnetic strip 6, is positioned to the left of minimum point M. Also, the output characteristics are shifted to the right, where the sensor balance is increased, such that the sensor output can be detected only in the area right to minimum point M as the lowest detecting output. In this case, the sensor output with magnetic strip 6 is smaller than as is without it.

It is important to establish the amount of offset of the output characteristics to be sufficient enough such that sensor output P0 is not shifted to the right beyond the minimum point even when the balance is fluctuated due to changes in the temperature characteristics or abrasion characteristics of magnetic sensor portion 5 caused by some causes from the outside. In other words, reference sensor output P0 is established within a range where it does not go right beyond minimum point M when the balance is changed due to abrasion and the like. Accordingly, the range where the balance fluctuates is constantly located on the left of the minimum point such that the output can be correctly detected by using linearity of the sensor output.

Figure 19:
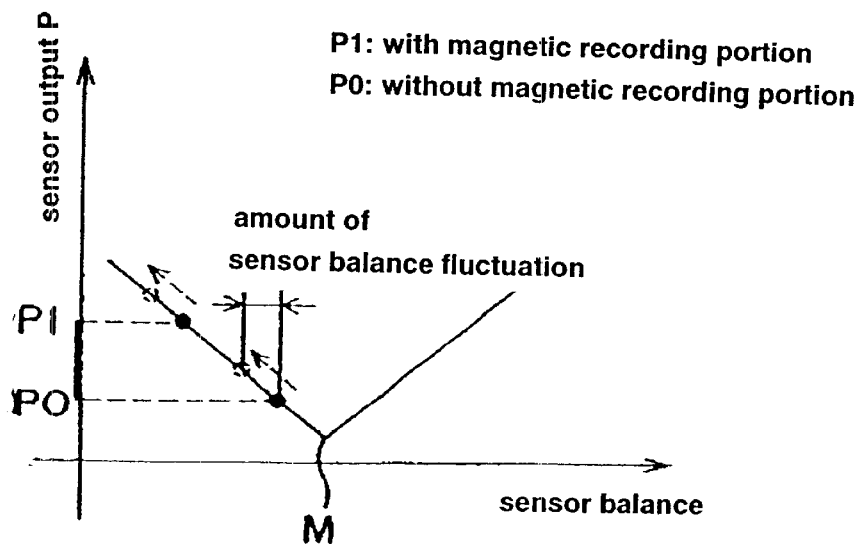
FIG. 19 is a graph of the sensor balance and the output indicating when the sensor balance fluctuates after offset adjustment.

Additionally, in the case that the output characteristics are adjusted by offset as is in this embodiment, sensor outputs P0, P1 are recorded before and after detecting the sensor output to detect magnetic strip 6 based on the relative amount of change (P1−P0). Hence, when the sensor balance is fluctuated after adjustment with offset, as shown in FIG. 19, no error is caused in the relative amount of change before and after detecting the sensor output (P1−P0) such that the detected value is more accurate compared to the one using absolute values.

Further, when the sensor output characteristics are adjusted by offset, the offset can be made towards the left as described above, or offset can be made such that the sensor output changes only in the area to the right of minimum point M to avoid sensor output P1 during detection of a medium not passing minimum point M to the left even when, for example, the balance fluctuates.

Figure 16:
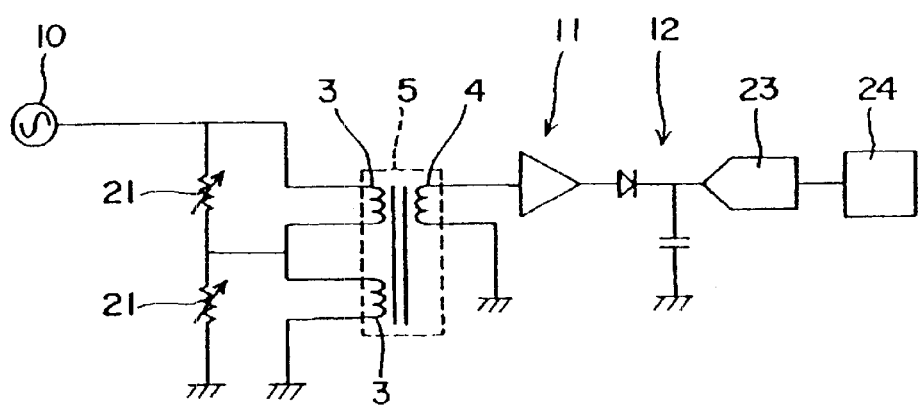
FIG. 16 shows a modified example of a detecting circuit including an adjustment means.

The above embodiment shows an example of a detecting circuit; however, one is not limited to the above as a circuit applicable to a magnetic medium detecting apparatus. For example, the variable condenser can be omitted as shown in FIG. 16. In other words, variable condenser 22 of a circuit shown in FIG. 15 is a means to adjust the phase on the side of the magnetizing such that reference sensor output P0, while detection of a medium is not performed, is located at minimum point M. If it is not necessary to locate reference sensor output P0 at minimum point M as described above, one does not have to use a variable condenser which can adjust the phases.

Figure 17:
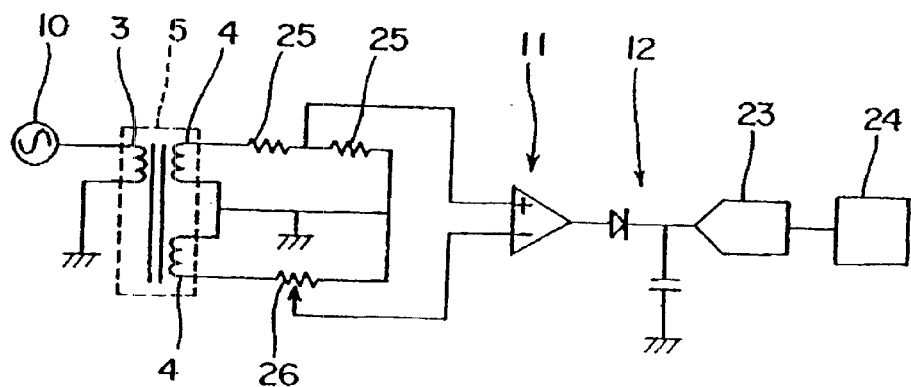
FIG. 17 shows an example of a circuit comprising an adjustment means on its detecting side.

Also, as shown in FIG. 17, a circuit comprising a means to adjust the balance can be employed. In this case, lead wire 3a of magnetic sensor portion 5 is considered to be the detecting side while lead wire 4a is the magnetizing side in FIG. 3; then, one can modify the circuit such that detection of the sensor output is performed based on a difference in output values of the detecting side and the magnetizing side since the detecting side is used as a differential circuit having multiple systems with a plurality of lead wires. Also, this circuit comprises two series fixed resistors 25, which are positioned on the detecting side, and slip resistor 26 which can adjust the balance by itself; as a result, the adjustment of the balance is enabled by operating only slip resistor 26. The circuits shown in FIGS. 15 through 17 comprise amplifying circuit 11, detecting phase circuit 12, A/D converter 23 and CPU 24 after detecting coil 4. Nonetheless, this is just one of many examples and is not substantially different from the detecting circuit shown in FIG. 5 in the function.

According to the magnetic medium detecting apparatus of this embodiment, offset is given to the sensor output characteristics in advance such that the sensor output is kept away from minimum point M as the lowest point after adjusting the balance. Further, magnetic detection is performed based on a relative amount of change between output before detection P0 and output during detection P1. Consequently, fluctuation in the sensor balance caused by outside causes after the offset adjustment does not have significant impact, therefore, the detection can be precisely performed. Also, desensitization of magnetic sensor portion 5 can be prevented by avoiding sensor output P from passing minimum point M. Additionally, once the offset adjustment is performed, readjustment of the sensor balance is not necessary until the sensor is replaced. Moreover, the life of the sensor can be determined to be ended when the fluctuation in the balance becomes exceptionally large in relation to the initial adjustment value.

When magnetic card 14 comprises a magnetic strip having multiple channels, it is preferable to place magnetic sensor portion 5 facing a gap region (guard band) between tracks of recording regions of the multiple channels.

As described above, the recording medium detecting apparatus of the present invention comprises a permeability sensor, which detects the permeability of a magnetic recording portion, and a magnetic head which detects the existence of the magnetic recording portion. Also, when the permeability of the magnetic recording portion to be detected is the first permeability close to the permeability of air, the coercive force is determined based on the output of the permeability sensor and the magnetic head. On the other hand, when the permeability of the magnetic recording portion to be detected is the second permeability which is further different from the permeability of air than the first permeability, the coercive force is determined based on the output of the permeability sensor. Therefore, one can correctly determine whether the permeability of the magnetic recording portion of a recording medium is the first permeability or the second permeability.

Additionally, in the recording medium detecting apparatus of the present invention, the permeability sensor, which detects the permeability of the magnetic recording portion, is placed to a sensor shifting mechanism such that it shifts between a contact position to contact the recording medium and a distant position to be distant from the recording portion. Then, the permeability sensor is shifted to the contact position when the coercive force is determined. Therefore, when the magnetic data on the magnetic recording portion of the recording medium is overwritten, for example, the permeability sensor contacts the magnetic recording portion when the coercive force of the magnetic recording portion needs to be determined; the contact between the permeability sensor and the magnetic recording portion can be prevented for the rest of the time. As a result, the change in the speed at which the recording medium is transferred can be prevented during reading/writing of data while the durability of the permeability sensor is increased by preventing friction thereof. Further, limitation on the location of the permeability sensor is decreased such that the apparatus can be more freely designed.

Moreover, according to the recording medium detecting method of the present invention, the recording medium detecting apparatus comprises a permeability sensor, which detects the permeability of a magnetic recording portion, and a magnetic head which detects the existence of the magnetic recording portion. Also, the magnetic head detects the existence of the magnetic recording portion while the permeability sensor detects the second permeability which is further different from the permeability of air; as a result, one can determine whether the permeability of the magnetic recording portion of the recording medium is the first permeability which is close to the permeability of air; the coercive force thereof is also determined. Therefore, one can correctly determine the permeability of the magnetic recording portion of the recording medium is whether the first permeability or the second permeability by using the correlation between the permeability of the magnetic recording portion and the coercive force.

What is claimed is:

1. A recording medium detecting apparatus for distinguishing between a recording medium having a relatively high coercivity and a recording medium having a relatively low coercivity, comprising:

a magnetic head to detect the existence of said magnetic reading portion, a permeability sensor having a first predetermined output in the absence of being coupled to said recording medium, said first predetermined output having a magnitude on a first side of a predetermined threshold, said permeability sensor when coupled to a recording medium having said higher coercivity parameter providing an output having a magnitude on said first side of said predetermined threshold, said permeability sensor when coupled to a recording medium having said lower coercivity parameter providing an output having a magnitude on a second side of said predetermined threshold, and means responsive to the output of said permeability sensor to provide a first output signal when said permeability sensor output is below said threshold and a second output signal when said permeability sensor output is above said threshold;

a medium insertion slot from which said recording medium is taken into the inside of said apparatus; and a shutter plate which is placed between said medium insertion slot and the inside of said apparatus and which can be opened or closed in relation to a medium transferring path to receive said recording medium into the inside of said apparatus; and wherein said permeability sensor and said magnetic head are located closer to said medium insertion slot than is said shutter plate.

2. A recording medium detecting apparatus according to claim 1 in which said magnetic head is selected from the group consisting of a wire-wound magnetic head and a magneto-resistant element head.

3. A recording medium detecting apparatus according to claim 1 comprising:

a medium insertion slot from which said recording medium is taken into the inside of said apparatus; and a shutter plate which is placed between said medium insertion slot and the inside of said apparatus and which can be opened or closed in relation to a medium transferring path to receive said recording medium into the inside of said apparatus; and wherein said magnetic head is located closer to said medium insertion slot than is said shutter plate and said permeability sensor is located toward the inside of the apparatus from said shutter plate.

4. A recording medium detecting apparatus according to claim 3 in which said magnetic head is selected from the group consisting of a wire-wound magnetic head and a magneto-resistant element head.

5. A recording medium detecting apparatus according to claim 1 comprising a sensor shifting mechanism which shifts said permeability sensor between a contact position, at which said permeability sensor is in contact with said recording medium, and a distant position, at which said permeability sensor is distant from said recording medium, wherein said sensor shifting mechanism shifts said permeability sensor to said contact position when determining said permeability.

6. A recording medium detecting apparatus according to claim 5 further comprising:

a medium insertion slot from which said recording medium is taken into the inside of said apparatus; and a shutter plate which is placed between said medium insertion slot and the inside of said apparatus and which can be opened or closed in relation to a medium transferring path to receive said recording medium into the inside of said apparatus; and wherein said permeability sensor and said magnetic head, which records/reproduces data, are placed further inside of said apparatus than is said shutter plate; and said permeability sensor is shifted to said contact position when the output of said magnetic head is detected.

7. A recording medium detecting apparatus according to claim 1 in which said permeability sensor comprises:

two main magnetic poles in which one of said magnetic poles has a gap portion and is connected to another pole via a connecting portion;

a magnetizing coil which is wound around said magnetic poles to generate a magnetic flux in said gap portion; and a detecting coil which is wound around said magnetic poles to detect a change in a magnetic flux generated by said magnetizing coil;

wherein a range of a change in a detecting output from said detecting coil is established to be larger than a range of a change in balance caused by outside causes applied to said detecting output in relation to the minimum level of said detecting output; and the change in said detecting output is directed to one direction when a magnetic flux in one of said main magnetic poles is changed by said recording medium.

8. A recording medium detecting apparatus according to claim 7 in which offset is provided such that said detecting output becomes larger than a change in balance of the output caused by outside causes applied to said detecting output wherein said detecting output increases or decreases in one direction when said detecting output changes due to said recording medium.

9. A recording medium detecting apparatus according to claim 1 in which said magnetic head and said permeability sensor are integrally formed.

10. A recording medium detecting apparatus which determines the coercive force of a recording medium to detect said recording medium comprising:

one of magnetic recording portions with different coercive forces which have first permeability closer to the permeability of air or second permeability further different from the permeability of air than said first permeability;

a permeability sensor which detects the permeability of said magnetic recording portion; and a sensor shifting mechanism which shifts said permeability sensor between a contact position, at which said permeability sensor is in contact with said recording medium, and a distant position at which said permeability sensor is distant from said recording medium;

wherein said sensor shifting mechanism shifts said permeability sensor to said contact position when determining said permeability;

a magnetic head to detect the existence of said magnetic recording portions wherein said permeability sensor is shifted to said contact position only when the output of said magnetic head is detected.

11. A recording medium detecting apparatus according to claim 10 comprising:

a medium insertion slot from which said recording medium is taken into the inside of said apparatus; and a shutter plate which is placed between said medium insertion slot and the inside of said apparatus and which can be opened or closed in relation to a medium transferring path to receive said recording medium into the inside of said apparatus wherein said permeability sensor and said magnetic head are placed closer to said medium insertion slot than said shutter plate.

12. A recording medium detecting apparatus according to claim 10 wherein a contact sensor is placed on said sensor shifting mechanism having said permeability sensor to detect the contact of said permeability sensor with said recording medium.

13. A recording medium detecting apparatus according to claim 10 in which said permeability sensor comprises:

two main magnetic poles in which one of said magnetic poles has a gap portion and is connected to another pole via a connecting portion;

a magnetizing coil which is wound around said magnetic poles to generate a magnetic flux in said gap portion; and a detecting coil which is wound around said magnetic poles to detect a change in a magnetic flux generated by said magnetizing coil;

wherein a range of a change in a detecting output from said detecting coil is established to be larger than a range of a change in balance caused by outside causes applied to said detecting output in relation to the minimum level of said detecting output; and the change in said detecting output is directed to one direction when a magnetic flux in one of said main magnetic poles is changed by said recording medium.

14. A recording medium detecting apparatus according to claim 13 in which offset is provided such that said detecting output becomes larger than a change in balance caused by outside causes applied to said detecting output wherein said detecting output increases or decreases in one direction when said detecting output changes due to said recording medium.

15. A recording medium detecting apparatus according to claim 14 in which said offset is regulated by one of or both of a variable-resistance and a variable condenser which regulates a current flowing to said magnetizing coil and said detecting coil or the phase of said current.

16. A recording medium detecting apparatus for distinguishing between a recording medium having a relatively high coercivity and a recording medium having a relatively low coercivity, comprising:

a magnetic head to detect the existence of said magnetic reading portion, a permeability sensor having a first predetermined output in the absence of being coupled to said recording medium, said first predetermined output having a magnitude on a first side of a predetermined threshold, said permeability sensor when coupled to a recording medium having said higher coercivity parameter providing an output having a magnitude on said first side of said predetermined threshold, said permeability sensor when coupled to a recording medium having said lower coercivity parameter providing an output having a magnitude on a second side of said predetermined threshold, and means responsive to the output of said permeability sensor to provide a first output signal when said permeability sensor output is below said threshold and a second output signal when said permeability sensor output is above said threshold;

a medium insertion slot from which said recording medium is taken into the inside of said apparatus; and a shutter plate which is placed between said medium insertion slot and the inside of said apparatus and which can be opened or closed in relation to a medium transferring path to receive said recording medium into the inside of said apparatus; and wherein said magnetic head is located closer to said medium insertion slot than is said shutter plate and said permeability sensor is located toward the inside of the apparatus from said shutter plate.

17. A recording medium detecting apparatus for distinguishing between a recording medium having a relatively high coercivity and a recording medium having a relatively low coercivity, comprising:

a magnetic head to detect the existence of said magnetic reading portion, a permeability sensor having a first predetermined output in the absence of being coupled to said recording medium, said first predetermined output having a magnitude on a first side of a predetermined threshold, said permeability sensor when coupled to a recording medium having said higher coercivity parameter providing an output having a magnitude on said first side of said predetermined threshold, said permeability sensor when coupled to a recording medium having said lower coercivity parameter providing an output having a magnitude on a second side of said predetermined threshold, and means responsive to the output of said permeability sensor to provide a first output signal when said permeability sensor output is below said threshold and a second output signal when said permeability sensor output is above said threshold;

a sensor shifting mechanism which shifts said permeability sensor between a contact position, at which said permeability sensor is in contact with said recording medium, and a distant position, at which said permeability sensor is distant from said recording medium, wherein said sensor shifting mechanism shifts said permeability sensor to said contact position when determining said permeability;

a medium insertion slot from which said recording medium is taken into the inside of said apparatus; and a shutter plate which is placed between said medium insertion slot and the inside of said apparatus and which can be opened or closed in relation to a medium transferring path to receive said recording medium into the inside of said apparatus; and wherein said permeability sensor and said magnetic head, which records or reproduces data, are placed further inside of said apparatus than is said shutter plate; and said permeability sensor is shifted to said contact position when the output of said magnetic head is detected.

18. A recording medium detecting apparatus for distinguishing between a recording medium having a relatively high coercivity and a recording medium having a relatively low coercivity, comprising:

a magnetic head to detect the existence of said magnetic reading portion, a permeability sensor having a first predetermined output in the absence of being coupled to said recording medium, said first predetermined output having a magnitude on a first side of a predetermined threshold, said permeability sensor when coupled to a recording medium having said higher coercivity parameter providing an output having a magnitude on said first side of said predetermined threshold, said permeability sensor when coupled to a recording medium having said lower coercivity parameter providing an output having a magnitude on a second side of said predetermined threshold, and means responsive to the output of said permeability sensor to provide a first output signal when said permeability sensor output is below said threshold and a second output signal when said permeability sensor output is above said threshold;

two main magnetic poles in which one of said magnetic poles has a gap portion and is connected to another pole via a connecting portion;

a magnetizing coil which is wound around said magnetic poles to generate a magnetic flux in said gap portion; and a detecting coil which is wound around said magnetic poles to detect a change in a magnetic flux generated by said magnetizing coil;

wherein a range of a change in a detecting output from said detecting coil is established to be larger than a range of a change in balance caused by outside causes applied to said detecting output in relation to the minimum level of said detecting output; and the change in said detecting output is directed to one direction when a magnetic flux in one of said main magnetic poles is changed by said recording medium.

19. A recording medium detecting apparatus which determines the coercive force of a recording medium to detect said recording medium comprising:

one of magnetic recording portions with different coercive forces which have first permeability closer to the permeability of air or second permeability further different from the permeability of air than said first permeability;

a permeability sensor which detects the permeability of said magnetic recording portion; and a sensor shifting mechanism which shifts said permeability sensor between a contact position, at which said permeability sensor is in contact with said recording medium, and a distant position at which said permeability sensor is distant from said recording medium;

wherein said sensor shifting mechanism shifts said permeability sensor to said contact position when determining said permeability;

wherein a contact sensor is placed on said sensor shifting mechanism having said permeability sensor to detect the contact of said permeability sensor with said recording medium.

20. A recording medium detecting apparatus which determines the coercive force of a recording medium to detect said recording medium comprising:

one of magnetic recording portions with different coercive forces which have first permeability closer to the permeability of air or second permeability further different from the permeability of air than said first permeability;

a permeability sensor which detects the permeability of said magnetic recording portion; and a sensor shifting mechanism which shifts said permeability sensor between a contact position, at which said permeability sensor is in contact with said recording medium, and a distant position at which said permeability sensor is distant from said recording medium;

wherein said sensor shifting mechanism shifts said permeability sensor to said contact position when determining said permeability;

two main magnetic poles in which one of said magnetic poles has a gap portion and is connected to another pole via a connecting portion;

a magnetizing coil which is wound around said magnetic poles to generate a magnetic flux in said gap portion; and a detecting coil which is wound around said magnetic poles to detect a change in a magnetic flux generated by said magnetizing coil;

wherein a range of a change in a detecting output from said detecting coil is established to be larger than a range of a change in balance caused by outside causes applied to said detecting output in relation to the minimum level of said detecting output; and the change in said detecting output is directed to one direction when a magnetic flux in one of said main magnetic poles is changed by said recording medium.

* * * * *